July 9, 1968  R. E. DAWSON  3,392,277
WARNING LIGHT WITH REFLECTOR
Filed July 5, 1966  2 Sheets-Sheet 1

INVENTOR.
ROBERT E. DAWSON

INVENTOR.
ROBERT E. DAWSON ated July 9, 1968

3,392,277
WARNING LIGHT WITH REFLECTOR
Robert E. Dawson, Huntingdon Valley, Pa., assignor to R. E. Dietz Company, Syracuse, N.Y., a corporation of New York
Filed July 5, 1966, Ser. No. 562,818
2 Claims. (Cl. 240—41.3)

ABSTRACT OF THE DISCLOSURE

A lamp having an annular housing and oppositely facing lenses. The rear face of the forward lens has a plurality of annular concentric catadioptric elements and a reflector is provided adjacent the inner face of the rearward lens, the reflector having a plurality of concentric annular reflective surfaces around a transparent center portion. The surfaces are disposed at different angles for reflecting light toward the radially outer elements of the forward lens for increasing illumination thereat while the rearward lens is illuminated at its center.

---

This invention relates to warning lights and more particularly to such a light with reflector means to increase the intensity of the light emitted.

Warning lights have been provided with lenses having catadioptric elements and lenticular projections. The purpose of these improvements is to provide a conical beam of light having a comparatively narrow spherical angle of substantially uniform intensity across the beam. Since the lamp is located axially with respect to the concentric annular catadioptric rings of the lens it is difficult to provide a lens in which the light directed forward by the radially outer catadioptric elements is equal in intensity to that directed forward by the radially inner elements which are closer to the axis of the beam and to the lamp.

The principal object of the invention is to provide a warning lamp having reflector means for increasing the intensity of the light refracted and reflected forward by the annular catadioptric elements which are disposed radially outward on the lens.

Another important object is to provide a reflector member for warning lights having lenticular elements on the lens' forward surface for increasing the brilliance of the illuminated spot at those lenticular elements which are comparatively more remote from the center of the lens.

A still further object is to provide such a reflector member having a plurality of concentric annular reflective surfaces disposed at different angles in the light around the portion of the light adjacent the periphery.

Other objects and advantages will be apparent from the following description in conjunction with the accompanying drawings in which.

Figure 1:
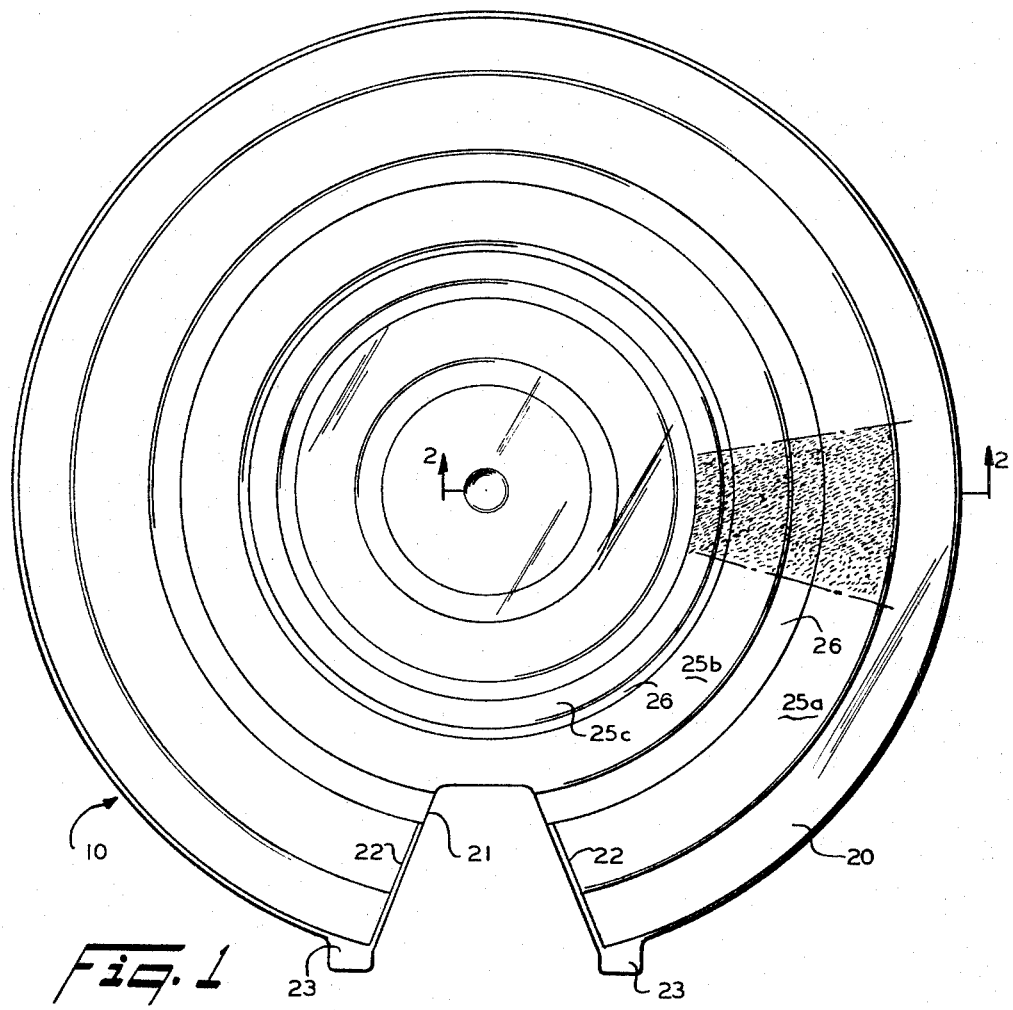
FIGURE 1 is a front elevational view of a reflector according to the invention, a small annular portion of a sector being stippled to show the metallized portions.

In the drawings the reflector member 10 is used in conjunction with a combined lamp housing and lens 11, made in two identical halves 11a and 11b, which snap together and interlock as more fully described in Patent 3,351,751, issued Nov. 7, 1967, to Fred F. Stube and Edward J. Nitsch. The optics of lens 11a, identical with that of 11b, is more fully described in co-pending application Ser. No. 414,103, filed Nov. 27, 1964, by Robert E. Dawson.

Figure 3:
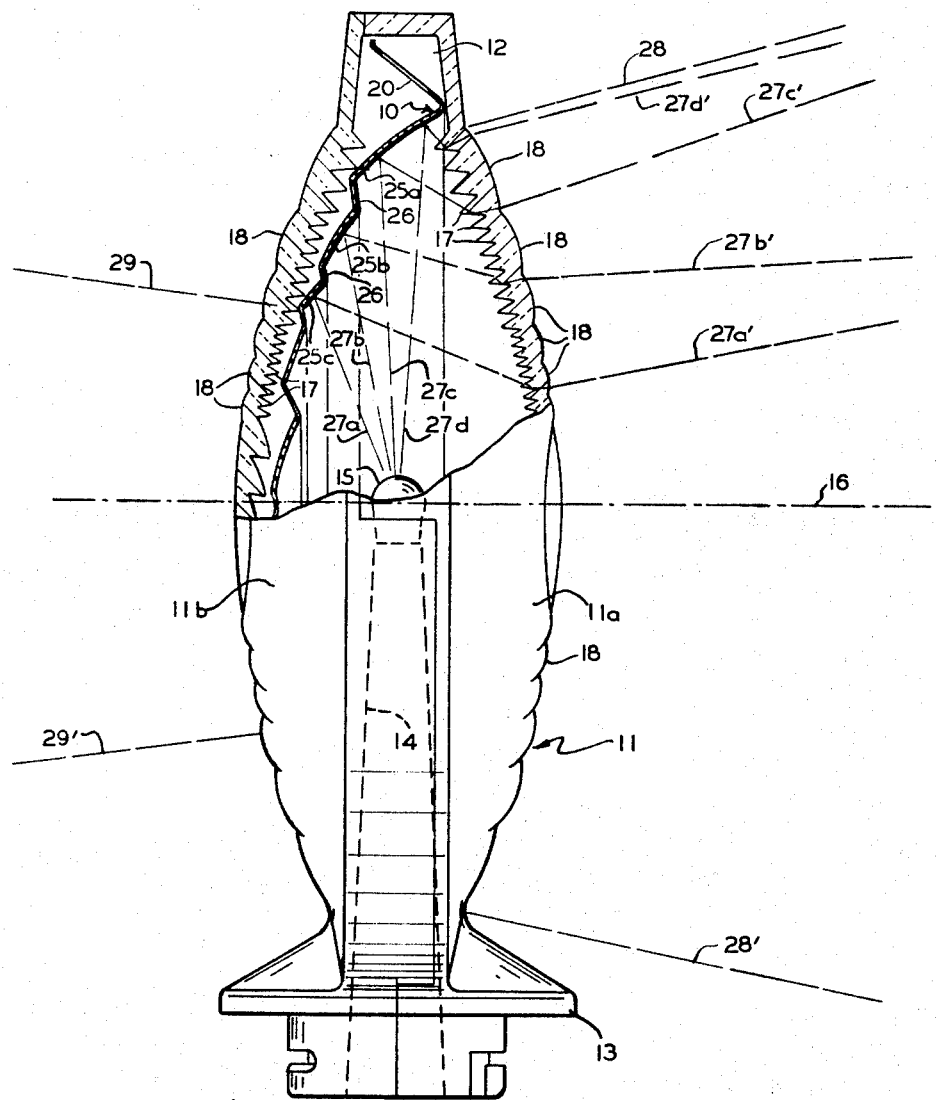
FIGURE 3 is a side elevational view of a warning light partly in section to show the reflector therein.

As best seen in FIGURE 3, the light 11 has a hollow perimetrical portion 12 and a hollow base portion 13 adapted to be secured on a battery case, not shown. An elongated lamp post, indicated at 14, is secured in the battery case and projects within the light 11 through the hollow base 13. It is provided with a socket for the lamp 15 at its end. The filament of lamp 15, not shown, is centrally located and lies on the axis entended 16 of the lens 11a.

The lens portions of the halves 11a and 11b are provided with a plurality of concentric annular catadioptric elements or tooth-like rings 17 on the lens surface nearer lamp 15 and with a plurality of convex spherically rounded lenticular elements or projections 18 on the lens surface more remote from lamp 15. Light from lamp 15 strikes the radially inward surface of each tooth-like element 17, of lens 11a, is refracted thereby, and then is reflected interiorly of the element toward the forward surface of the lens which bears the lenticular elements 18. Upon emerging from the forward surface, the light is again refracted by the element 18, all as more fully described in said co-pending application Ser. No. 414,103.

In order to increase the brilliance of the light refracted and reflected forward by those elements 17 more remote from the center of the lens, the reflector 10 is inserted in light 11 as shown in FIGURE 3. The peripheral portion 20 of the reflector conforms to and fits within the hollow peripheral portion 12 of light 11. The general concave-convex shape of reflector 10 conforms generally to the general interior shape of lens or light-portion 11b so that the reflector lies close to or against the inner surface of this portion 11b back of lamp 15 with respect to lens 11a. "Forward" and "back" as used hereinafter refers to the direction of light from lamp 15 passing through the lens 11a.

A cutout portion 21, FIGURE 1, is provided for the clearance of the lamp post 14 past the perimetrical portion 20 into the center of the light and reinforcing webs or flanges 22 are provided on either side of the cut-out 21. Projecting tongues 23 may also be provided on either side of the cut-out for engagement with cooperating recesses in the base portion 13 of the light.

Figure 2:
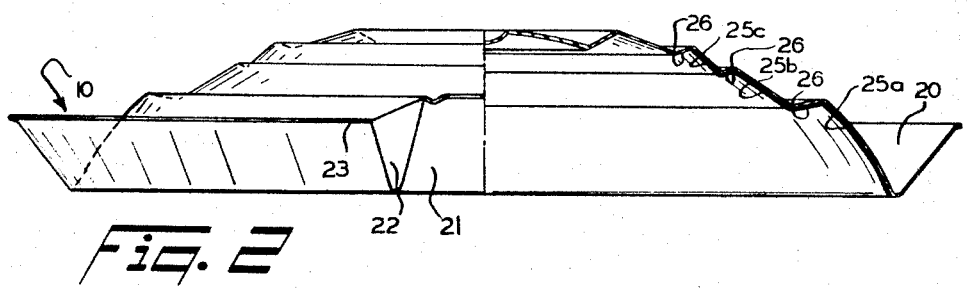
FIGURE 2 is an edge elevational view thereof partly in section on the line 2—2 of FIGURE 1.

Reflector 10 is formed with a plurality of concentric annular reflective surfaces 25 connected by annular connecting surfaces 26 as shown. The reflector is molded of a transparent plastic material and the surfaces 25a, 25b, 25c and intervening connecting surfaces 26 adjacent the periphery of the reflector are vacuum metalized to make the reflective surfaces reflectors as indicated by heavy lines in FIGURES 2 and 3 and the stippled sector portion in FIGURE 1. The center area of the reflector 10 may be left transparent so that some light passes through the lens 11b. Alternatively, of course, the reflector may be conventionally formed of metal.

The reflector surfaces 25a, 25b and 25c are slightly arcuate in any axial plane, as best seen at 25a, and the surfaces nearer the periphery extend over a longer distance radially of the reflector than the surfaces nearer the center. Each reflective surface is at a different angle, defined by the chord across its arc, in the light 11 for reflecting light on a different one or ones of the annular catadioptric elements 17. The broader surfaces being toward the outer edge of the reflector, more light is reflected by reflector 10 toward the outer elements 17 than the radially inner elements.

Due to the generally concave contour of reflector 10 light from lamp 15 is reflected by the reflective surfaces 25a, 25b and 25c toward the radially outward surfaces of the catadioptric elements 17, refracted by this first surface, and then reflected internally of the element toward the forward surface of the lens 11a. While light coming directly and radially forward from lamp 15 is received by the radially inward surface of each element 17, the reflected light from reflector 10 is received by the radially outward surface of each element 17 making it possible to control the direction of the forwardly refracted and reflected light from the reflector independent of the light received directly from lamp 15.

The connecting surfaces 26, it will be noted are not reflector surfaces since they extend radially of lamp 15. Each connecting surface, in an axial plane, extends in a direction aligned with the center of the lamp and therefore neither receive nor reflect any substantial amount of light.

In FIGURE 3 rays of light 27a, 27b, 27c, and 27d, diagrammatically represented by broken lines, are reflected by different reflective surfaces forwardly and counter-radially of the lamp on different catadioptric elements 17, are refracted and reflected thereby forwardly, and again refracted on emerging from the forward face of lens 11a in the directions indicated diagrammatically by broken lines 27a', 27b', 27c', and 27d'. All the light emerging forwardly of lens 11a is substantially confined in a conical beam whose limits are indicated by the broken lines 28 and 28'.

Figure 4:
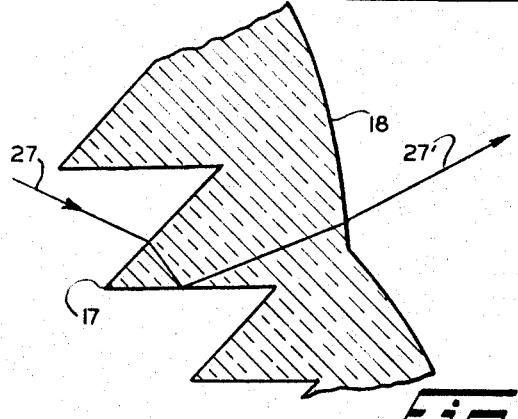
FIGURE 4 is a greatly enlarged fragmentary diagrammatic sectional view of a portion of the lens showing the refraction and reflection thereby of light from the reflector.

An enlarged view in FIGURE 4 shows diagrammatically a beam 27 reflected forward and radially inward by reflective surface 25a to the element 17, refracted and reflected thereby to the lenticular element 18, and there refracted forward as at 27'.

Due to reflector 10 being transparent at its center, some light emerges rearwardly of light 11 through lens 11b in a narrower conical beam whose limits are indicated by the broken lines 29 and 29' in FIGURE 3.

As will be apparent to those familiar with the art, the invention may be embodied in other specific forms without departing from the spirit or essential characteristics thereof. The embodiment disclosed therefore is to be considered in all respects as illustrative rather than restrictive, the scope of the invention being indicated by the appended claims.

What is claimed is:

1. In combination with a light having a housing, a lamp having a filament centrally disposed in the housing, and a lens secured in the housing forward of the lamp, the lens having a forward light-emitting surface and a rear surface facing the lamp and having a plurality of annular concentric contiguous catadioptric elements on said rear surface, each element having a radially inner surface for receiving and refracting light from the lamp and a radially outer surface for receiving the refracted light from the inner surface and reflecting the same internally of the element toward the forward surface of the lens; a reflector member rearward of the lamp having a plurality of concentric annular reflective surfaces disposed at substantially different angles to the lamp for reflecting light from the lamp toward the radially outer surfaces of different ones of the radially outer elements, the reflector surfaces being so disposed that light reflected thereby is received by the element outer surfaces and refracted toward the element inner surface and reflected thereby internally of the element toward the lens forward surface.

2. In a warning light having a housing, a lamp disposed in the housing, and a generally concave-convex lens on either side of the lamp, each lens having a generally convex light emitting surface on the side more remote from the lamp, the combination of: a plurality of annular concentric contiguous catadioptric elements on the surface nearest the lamp of at least one lens, each element having a radially inner surface for receiving and refracting light from the lamp and a radially outer light reflecting surface disposed at an angle to the inner surface for receiving light from the inner surface and reflecting the same internally of the element toward the light emitting surface of the lens; and a reflector member of convoluted thin transparent plastic material on the side of the lamp opposite the lens having the catadioptric elements, the member having a plurality of concentric annular metalized reflective surfaces disposed at different angles in the lamp for reflecting light from the lamp toward the radially outer surfaces of different ones of the radially outer elements, the reflective surfaces being so disposed that light reflected thereby is refracted by the element outer surfaces toward the element inner surface and reflected by the inner surface internally of the element toward the light emitting surface of the lens, the reflector reflective surfaces being connected by surfaces which extend substantially radially of the lamp, the reflector conforming generally to the configuration of the adjacent lens at its center and to the peripheral configuration of the lens at its periphery, the reflector having an unmetalized and transparent portion at its center, whereby the radially outward portion of the lens opposite the reflector is more brightly illuminated and the lens adjacent the reflector is illuminated at its center.

References Cited

UNITED STATES PATENTS

| | | | |
|---|---|---|---|
| 1,573,578 | 2/1926 | Rosenbluth | 240—8.22 |
| 2,673,288 | 3/1954 | Stevens et al. | 240—41.36 |
| 2,831,394 | 4/1958 | Heenan et al. | 240—41.3 X |
| 3,180,979 | 4/1965 | Thurston | 240—41.3 X |
| 3,204,093 | 8/1965 | Heenan | 240—41.3 |
| 3,283,142 | 11/1966 | Freeman | 240—41.36 |

NORTON ANSHER, *Primary Examiner.*

JOHN M. HORAN, *Examiner.*

W. A. SIVERTSON, *Assistant Examiner.*